United States Patent [19]
Olson et al.

[11] Patent Number: 5,257,408
[45] Date of Patent: Oct. 26, 1993

[54] METHOD FOR SEEKING A COMMUNICATION SYSTEM

[75] Inventors: Carl B. Olson, San Carlos, Calif.; Gary W. Grube, Palantine, Ill.

[73] Assignee: Motorola, Inc., Schaumburg, Ill.

[21] Appl. No.: 875,948

[22] Filed: Apr. 30, 1992

[51] Int. Cl.$^5$ .................... H04B 17/00; H04B 7/26
[52] U.S. Cl. .................... 455/67.6; 455/54.1
[58] Field of Search .......... 455/67.1, 54.1, 38.3, 455/52.3, 67.3, 67.5, 67.6, 70, 62, 56.1, 69

[56] References Cited

U.S. PATENT DOCUMENTS

| | | | |
|---|---|---|---|
| 4,670,906 | 6/1987 | Thro | 455/56.1 |
| 5,056,109 | 10/1991 | Gilhousen et al. | 455/69 |

*Primary Examiner*—Reinhard J. Eisenzopf
*Assistant Examiner*—Thanh C. Le
*Attorney, Agent, or Firm*—Timothy W. Markison; Steven G. Parmelee

[57] ABSTRACT

In a network of communication systems that comprises a plurality of communication systems, the following discloses a method that allows a communication unit that is seeking a communication system to monitor to verify the integrity of both the transmit communication path and the receive communication path. The first step is for the communication unit to acquire synchronization with the communication system. Having acquired synchronization with the communication system, the communication unit receives transmission parameters of the communication system. Based on the transmission parameters, the communication unit calculates a talk-out gain of the transmit communication path and a talk-in gain of the receive communication path and then calculates a transmit communication path loss and a receive communication path loss. The communication unit will access the communication system when the talk-out gain of the transmit communication path is above the transmit communication path loss and when the talk-in gain of the receive communication path is above the receive communication path loss.

6 Claims, 2 Drawing Sheets

METHOD FOR SEEKING A COMMUNICATION SYSTEM

FIELD OF THE INVENTION

This invention relates generally to communication units in particular to a method that allows a communication unit to seek out a communication system to affiliate with based on both the integrity of the transmit and receive communication paths.

BACKGROUND OF THE INVENTION

Communication systems are known to comprise a plurality of communication units, a limited number of communication resources that are transceived by base stations or repeaters, and a communication resource allocator that allocates the communication units among the plurality of communication units. A communication resource may comprise a time division multiplex (TDM) slot(s), a carrier frequency, a pair of carrier frequencies, or any other means for transceiving RF information.

As is also known, communication systems, or communication sites, may be linked together to form a communication system network. Within a communication system network, a communication unit may operate in any system, or site. When a communication unit is seeking a communication system, or communication site, to monitor, it listens for control channel information to determine if it can ascertain information from it. (Monitoring a communication system or site comprises receiving outbound signalling words (OSW) via the control channel of that particular communication system or site.) If the communication unit is receiving usable information from the control channel, i.e. the signal strength of the received OSWs is acceptable for the communication unit's receiver, the communication unit monitors this communication system or site.

Once a communication unit is monitoring a particular communication system or site, i.e., receiving OSWs on the control channel of that system, the communication unit assumes that it has full access to that particular communication system, i.e. it can transmit and receive audio and data information. Depending on the communication unit's location within the system or site, it may be capable of receiving OSWs, but it may not be able to accurately transmit inbound signalling words (ISW) to the communication resource allocator. This unfortunate situation occurs because of the transmission power differences between a communication unit and a communication resource allocator. A typical communication resource allocator has a transmission power of about 100 Watts, while a communication unit's transmission power varies from a few Watts to 35 Watts. Thus, even though the communication unit is able to receive OSWs, its transmission power is too weak to transmit ISWs accurately.

One technique to overcome this problem is for the communication resource allocator, upon receiving an ISW from the communication unit, to transmit a signal indicating to the communication unit whether it need to raise or lower its transmitting power. This approach improves the transmitting abilities of the communication unit, however, the communication unit can only transmit up to its maximum power. Therefore, a need exists for a method that allows a communication unit to seek a communication system to monitor based on the quality, or integrity, of the transmit communication path and the receive communication path.

SUMMARY OF THE INVENTION

These needs and other are met by the method for seeking a communication system disclosed herein. In a network of communication systems that comprises a plurality of communication systems, wherein each communication system includes a plurality of communication units that are arranged into communication groups, a limited number of communication resources that are transceived via a limited number of repeaters, and a communication resource allocator that allocates a limited number of communication resources among the plurality of communication units, the following discloses a method that allows a communication unit that is seeking a communication system to monitor to verify the integrity of both the transmit and receive paths. To begin the process, the communication unit must acquire synchronization with the communication system. Once the communication unit is synchronized with the communication system, the communication unit receives transmission parameters of the communication system and calculates a talk-out gain of the transmit communication path and a talk-in gain of the receive communication path. Having calculated these parameters, the communication unit then calculates a transmit communication path loss and a received communication path loss. The communication unit will monitor the communication system when the talk-out gain of the transmit path is above the transmit path loss and when the talk-in gain of the receive communication path is above the receive communication path loss.

DESCRIPTION OF A PREFERRED EMBODIMENT

Generally, two-way radio communication systems provide communication services to communication units located within a particular coverage area, or site. Two or more such communication systems can become a network of communication systems to provide communication services to communication units over a larger composite coverage area. A communication unit seeking a communication system to monitor may have several such communication systems to choose from when the communication systems are so constructed as to provide overlapping coverage to the present location of a communication unit. The present invention enables the communication unit to choose a communication system that is capable of supporting communications in both directions between the communication system and the communication unit. Many such communication systems are constructed differently with varying transmit power levels and with varying receiver sensitivities. Both of these transmission parameters affect the communication unit's ability to communicate in both directions with the communication system.

In addition to variations in communication system design, numerous communication unit designs are employed, with varying transmit power levels (i.e. some with very high transmit power level capabilities and some with very low transmit power capabilities) and with varying receiver sensitivities. These communication unit transmission parameters also affect the communication unit's ability to communicate in both directions with the communication system. The present invention allows the communication unit to verify the integrity of both the transmit and receive communication paths between the communication unit and a potential host communication system. The communication unit does this by taking into account the transmission parameters associated with both the communication system and the communication unit. This ensures that reliable communications can take place between the communication system and the communication unit before communications is attempted or established.

The communication system broadcasts transmission parameters that assist the communication unit in analyzing the integrity of both the talk-out (from the communication system to the communication unit) and talk-in (in to the communication system from the communication unit) communication paths before the communication system is monitored for communication access. The communication unit takes into account its own transmission parameters and those of the candidate communication system when analyzing the integrity of the transmit and receive communication paths. Not only will the communication unit determine these parameters before affiliating itself with the communication system, the unit will also determine these parameters prior to requesting communication services.

Figure 1:
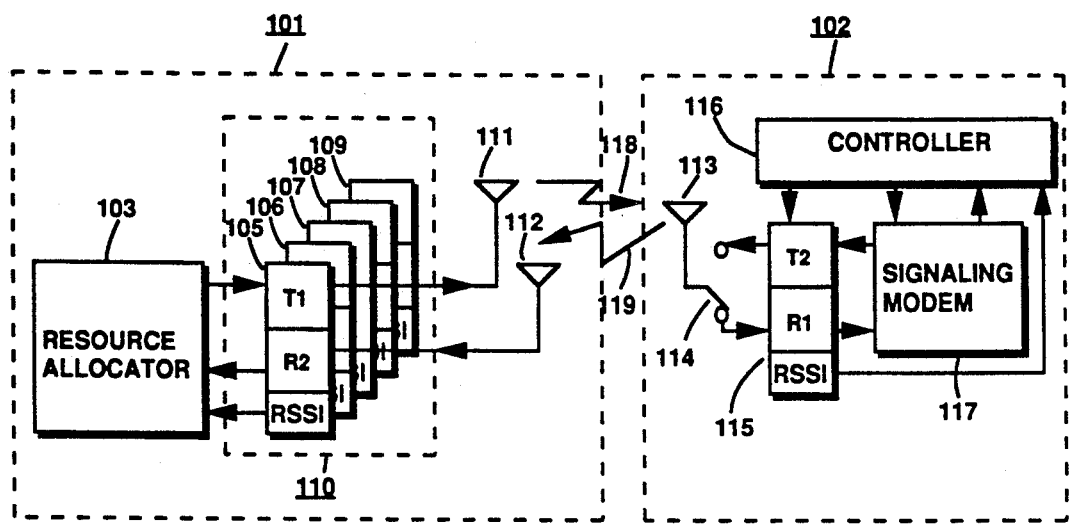
FIG. 1 illustrates a schematic diagram of a communication system and a communication unit in accordance with the present invention.

FIG. 1 illustrates a communication system 101 and a communication unit 102 operably coupled together in accordance with the present invention. The communication system 101 comprises a resource allocator 103, a limited number of communication resources 110, a transmit antenna system 111 to broadcast communication system transmission parameters 118 within a coverage area to the communication unit 102, and a receive antenna system 112 to receive communication 119 within a coverage area from the communication unit 102. The limited number of communication resources 110 comprises one or more repeaters 105, 106, 107, 108, 109, each of which is equipped with a Received Signal Strength Indicator (RSSI) and is operably coupled to the resource allocator 103 and to the transmit antenna system 111 and to the receive antenna system 112.

The communication unit 102 comprises an antenna system 113, which is operably coupled to a transceiver 115 through an antenna switch 114, a controller 116, and a signaling modem 117. Such an arrangement is well known in the art. The transceiver 115 is operably coupled to the controller 116, which may be a microprocessor (e.g., Motorola MC68HC11 microprocessor), directly and indirectly through the signaling modem 117. The controller 116 can switch the frequency of the transceiver 115, read the value of the measurements made by the Received Signal Strength Indicate (RSSI) detector, and switch the mode of the transceiver 115 between receive and transmit. The signaling modem 117 converts modulation waveforms to and from the transceiver 115 into digital signals suitable for the controller 116.

The transceiver 115 receives modulated radio signals 118 from the communication system 101. One such modulation waveform received by the transceiver 115 results in a collection of bits that encode a transmission parameter broadcast from the communication system 101. Many such modulation and encoding schemes exist. The present invention focuses on one aspect of the content and purpose of the signal 118, not the format.

In a preferred embodiment, the integrity test of the transmit and receive paths rely on the use of transmission parameters as an indication of how the communication system is performing. One such transmission parameter is an effective radiated power (ERP) of the channel under consideration. That is, resource allocator 103 might encode an indication of the actual ERP, based upon a current power level of the repeater 105 and a predicted gain factor for the transmit path from the repeater 105 to and including the transmit antenna 111 (the use of actual ERP is significant, since the power level of the repeater may vary from time to time to meet other system requirements). Therefore, the communication unit 102 is presented with the current ERP for the channel under consideration. Since the aforementioned transmission parameter ERP refers to the outbound (with respect to the communication system) ERP, it will be denoted ERPo from this point forward. A similar transmission parameter exists for the communication unit 102 and is known by the unit. The communication unit 102 uses these parameters to evaluate the integrity of the communication paths between the communication system 101 and the communication unit 102. The ERP value associated with the communication unit 102 will be denoted by ERPi, to represent the ERP of the inbound (with respect to the communication system) communication path.

An additional transmission parameter includes an effective receiver sensitivity (ERS) of the channel under consideration. That is, resource allocator 103 might encode an indication of the actual ERS, based upon a current receiver sensitivity factor of the repeater 105 and a predicted gain factor for the receive path from and including the receive antenna 112 to the repeater 105 (the use of actual ERS is significant, since the gain of the antenna may vary from time to time to meet other system requirements). Therefore, the communication unit 102 is presented with the current ERS for the channel under consideration. Since the aforementioned transmission parameter ERS refers to the inbound (with respect to the communication system) ERS, it will be denoted ERSi from this point forward. A similar transmission parameter exists for the communication unit 102 and is known by the unit. The communication unit 102 uses these parameters to evaluate the integrity of the communications paths between the communication system 101 and the communication unit 102. The ERS value associated with the communication unit 102 will be denoted by ERSo, to represent the ERS of the outbound (with respect to the communication system) communication path.

Figure 2:
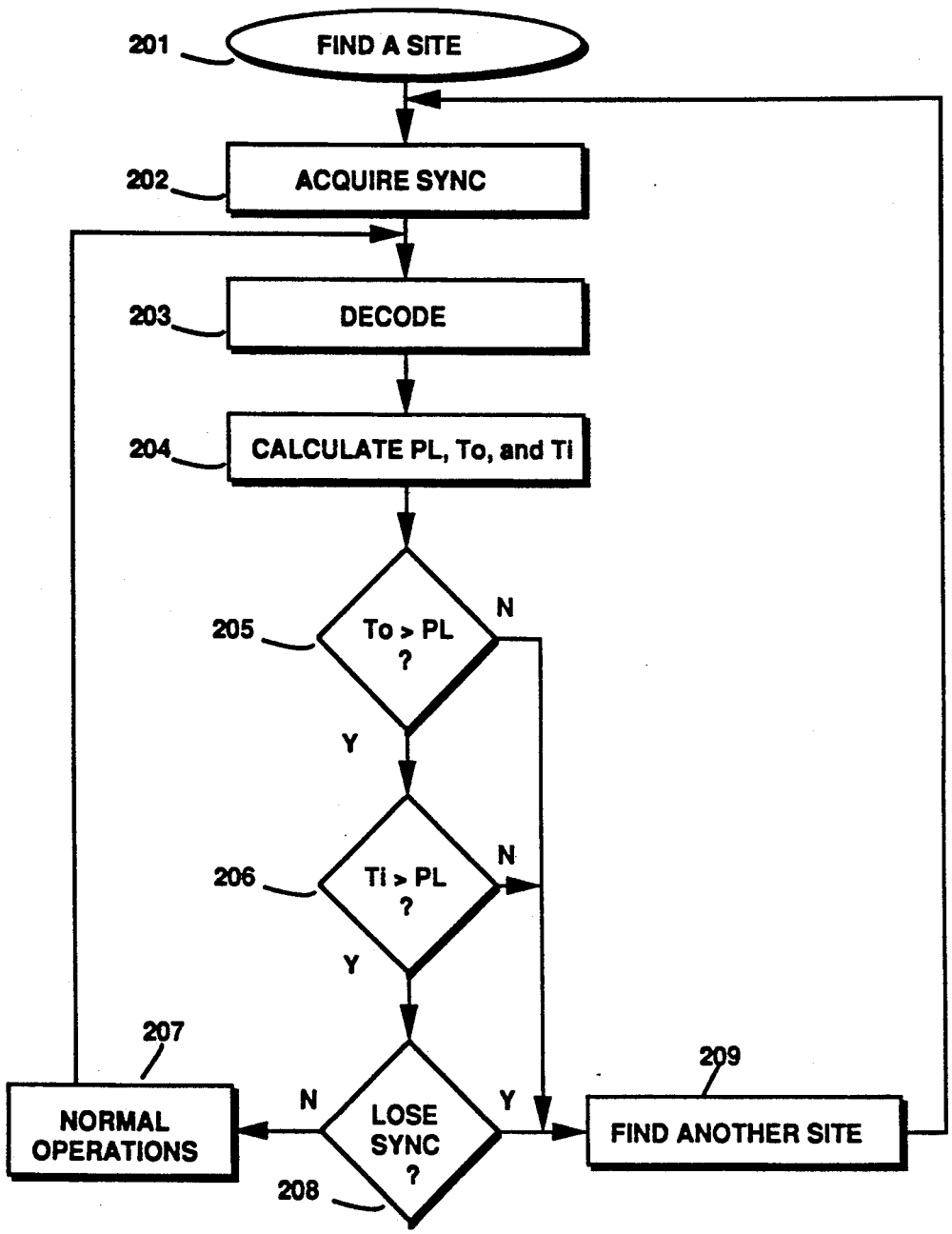
FIG. 2 illustrates a logic diagram that may be used by a communication unit to implement the present invention.

FIG. 2 illustrates a flow diagram that a communication unit may utilize to implement the present invention. It is assumed that this algorithm will be stored and processed with existing memory and processors, however, additional memory and processing capabilities may need to be added. At step 201, a communication unit scans a list of communication channel candidates in search of an active channel associated with at least one communication system or site. Presumedly, there may be two or more such communication systems that could serve the communication unit. When a site has been found, as indicated by channel activity, the communication unit will then acquire sychronization 202 to the modulated radio signals such that the encoded information broadcasts can be decoded. Of the many potential broadcasts and signals present, the communication unit will decode 203 the broadcast information related to the transmission parameters, ERPo and ERSi, for the present channel under consideration that is a part of the communication system.

As with any two-way radio communication system, there is a path loss associated with the free space between the communication system antenna 111 and the communication unit antenna 113. The path loss (PL) can be expressed as:

$$PL = ERPo - RSSIo$$

RSSIo refers to the received signal strength indicate measured in the outbound direction at the communication unit transceiver 115. That RSSI measuring device is calibrated, taking into account the ERSo of the communication unit transceiver 115, such that the above equation holds true. Accordingly, the communication unit calculates 204 PL based upon the decoded value of ERPo and the measurement of RSSIo.

A talk-out gain (To) factor and a talk-in gain factor (Ti) are calculated 204 in preparation of communication integrity analysis. The talk-out gain factor and talk-in gain factor can be expressed as:

$$To = ERPo - ERSo - c1$$

$$Ti = ERPi - ERSi - c2$$

The terms c1 and c2 are constants, such as 10 dB, which is included to provide an acceptable performance margin under varying radio propagation conditions due to multipath, fading and modulation type. Accordingly, the communication unit calculates 204 To and Ti, based upon the decoded values of the communication system transmission parameters, ERPo and ERSi, and knowledge of its own ERPi and ERSo, and of the constant terms c1 and c2.

The talk-out and talk-in gain factors represent the maximum short term allowable average path loss between the communication system and the communication unit to ensure proper integrity of the transmit and receive communication paths. The path loss from the communication system antenna system 111 to communication unit antenna system 113 is assumed to be equal to the path loss from the communication unit antenna system 113 to communication system antenna system 112. The path loss for the outbound transmission path 118 is the same as the path loss for the inbound transmission path 119.

The communication unit compares 205 the value of To to PL and, if the value of To is greater than the value of PL, the outbound path has successfully passed the integrity test. With the outbound path verified, the communication unit compares 206 Ti with PL and, if the value of Ti is greater than the value of PL, the inbound path has successfully passed the integrity test. When the inbound and outbound paths have been successfully verified, the communication unit continuously monitors the communication system for synchronization and potential access. As long as synchronization is maintained 208, the communication unit executes normal operations 207 with this communication system. Normal operations may include such two-way radio services as telephone interconnect or group dispatch communications. The normal operations mode 207 is followed by a continual check of the integrity of the communication paths by returning to the step of decoding the most recent communication system transmission parameters 203 in order to repeat the above process.

Should the aforementioned integrity tests fail, 205, 206, or should the communication unit lose synchronization 208 with the communication system, the communication unit will scan a list of communication channel candidates in search of an active channel associated with at least one different communication system or site. This process will find another site 209 that the communication unit can potentially use. When another site is found, the process is repeated starting with the step of acquiring synchronization 202 with the new site.

Accordingly, a communication unit which employs the present invention is able to analyze the integrity of both the transmit and receive communication paths to and from a communication system through the process of passively decoding transmission parameter broadcasts from a candidate communication system, measuring the current signal strength from the candidate communication system, and comparing calculated path gains with calculated current path losses. This method allows a communication unit to judge both communication paths, inbound and outbound, without the need for it to transmit test signals or to proceed with any unnecessary access attempts. This method is beneficial when a communication unit first attempts to access a communication system (e.g., site acquisition) and when the communication unit attempts to perform operations when it is beyond the reliable coverage range of the communication system. This is especially important for radio systems that have an imbalance between the talk-out and talk-in gains and that employ a multitude of half-duplex communication units that are not able to continuously analyze the inbound path integrity as they roam about. In anticipation of an inbound communication requirement, the communication unit is now able to continually anticipate an inbound path problem without actually attempting an inbound transmission access. Should a problem be detected, the communication unit can now immediately take corrective action in the form of locating a more suitable communication system to serve its needs.

We claim:

1. In a network of communication systems that comprises a plurality of communication systems, wherein each communication system includes a plurality of communication units that are arranged into communication groups, a limited number of communication resources that are transceived via a limited number of repeaters, and a communication resource allocator that allocates the limited number of communication resources among the plurality of communication units, wherein, a method that allows a communication unit, that is seeking a communication system, to monitor integrity of both transmit and receive communication paths, the method comprises the steps of:
   a) acquiring synchronization with a communication system;
   b) receiving transmission parameters of the communication system;
   c) calculating talk-out gain of the transmit communication path and talk-in gain of the receive communication path;
   d) calculating a transmit communication path loss and a receive communication path loss; and e) when the talk-out gain of the transmit communication path is above the transmit communication path loss and when the talk-in gain of the receive communication path is above the receive communication path loss, monitoring the communication system.

2. In the method of claim 1, the receiving of transmission parameters of step (b) further comprises receiving, as part of the transmission parameters, effective radiated power of a communication system transmitter and receiving, as part of the transmission parameters, effective receiver sensitivity of a communication system receiver.

3. In the method of claim 2, the calculation of the talk-out gain and the talk-in gain of step (c) further comprises calculating differences between the received transmission parameters and the transmission parameters of the communication unit.

4. In the method of claim 1, the calculation of the transmit communication path loss of step (d) further comprises calculating differences between the effective radiated power of the communication system transmitter and the measured signal strength of the received signal.

5. In the method of claim 4, the calculation of the transmit communication path loss of step (d) further comprises equating the receive communication path loss to the transmit communication path loss.

6. The method of claim 1 further comprises when the talk-out gain of the transmit communication path is below the transmit communication path loss or when the talk-in gain of the receive communication path is below the receive communication path loss, seeking a new communication system to monitor.

* * * * *